(12) United States Patent
Debique et al.

(10) Patent No.: US 7,725,920 B2
(45) Date of Patent: May 25, 2010

(54) MEDIA FOUNDATION MEDIA SINK

(75) Inventors: Kirt Debique, Seattle, WA (US); Rebecca C. Weiss, Menlo Park, CA (US); Robin C. B. Speed, Hampshire (GB); James H. Dooley, IV, Bellevue, WA (US); Alexandre Grigorovitch, Redmond, WA (US); Eduardo P. Oliveira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1534 days.

(21) Appl. No.: 10/608,869

(22) Filed: Jun. 27, 2003

(65) Prior Publication Data

US 2004/0268369 A1    Dec. 30, 2004

(51) Int. Cl.
*H04N 7/16* (2006.01)
*G06F 3/00* (2006.01)
*G06F 9/44* (2006.01)
*G06F 9/46* (2006.01)
*G06F 13/00* (2006.01)

(52) U.S. Cl. ............... 725/146; 719/315; 719/318
(58) Field of Classification Search ............ 725/144; 719/313, 315, 316, 318
See application file for complete search history.

(56) References Cited

U.S. PATENT DOCUMENTS

| | | | | |
|---|---|---|---|---|
| 6,453,355 | B1 * | 9/2002 | Jones et al. | ............ 709/230 |
| 2003/0079036 | A1 * | 4/2003 | Terada et al. | ............ 709/231 |
| 2004/0264383 | A1 | 12/2004 | Rudolph et al. | |
| 2004/0267778 | A1 | 12/2004 | Rudolph | |
| 2004/0267953 | A1 | 12/2004 | Dunbar et al. | |
| 2004/0268369 | A1 | 12/2004 | Debique et al. | |
| 2005/0132408 | A1 * | 6/2005 | Dahley et al. | ............ 725/80 |

OTHER PUBLICATIONS

"An Introduction to Quicktime" webpage. Archived Apr. 18, 2003. http://web.archive.org/web/20030418094210/developer.apple.com/quicktime/qttutorial/.*
"Quicktime 6 API Reference". Sep. 2002. Apple Computer, Inc.*
"Quicktime 6 API Reference" Apple Computer, Sep. 2002.*
Nathan Faiman, David Giese, A Rokanuzzaman, Mark Schroeder, *A Survey of the Java Media Framework 2.0*, Feb. 23, 2000, 54 pages total.
Nathan Faiman et al., A Survey of the Java Media Framework 2.0, Feb. 23, 2000, pp. 1-49.

* cited by examiner

*Primary Examiner*—Scott Beliveau
*Assistant Examiner*—Bennett Ingvoldstad
(74) *Attorney, Agent, or Firm*—Shook Hardy & Bacon, LLP (57) ABSTRACT

A method and system provides interfaces, data structures and events for representing a "sink" of multimedia data to interact with objects in a multimedia system to control multimedia objects. The interfaces and data structures enable efficient management for media objects that must interface directly with each other. One embodiment is directed to providing a common interface and a single API to a plurality of media objects. In an embodiment, the API is a control layer that isolates the media objects from each other and provides a single point of control, allowing media objects to be added or removed without affecting any other media objects. The control layer allows users to become familiar with only one API instead of many thereby facilitating the tasks of programming and documentation.

45 Claims, 4 Drawing Sheets

MEDIA FOUNDATION MEDIA SINK

TECHNICAL FIELD

This invention relates generally to computing and, more particularly, relates to handling multimedia data in a computing environment.

BACKGROUND OF THE INVENTION

As the abilities of computers expand into entertainment genres that once required separate electronic components, increased efficiency and user-friendliness is desirable. One solution is Microsoft's® DirectShow®, which provides playback of multimedia streams from local files or Internet servers, capture of multimedia streams from devices, and format conversion of multimedia streams. DirectShow enables playback of video and audio content of file types such as MPEG, Apple® QuickTime®, Audio-Video Interleaved (AVI), and WAV.

DirectShow includes a system of pluggable filter components. Filters are objects that support DirectShow interfaces and can operate on streams of data by reading, copying, modifying and writing data to a file. The basic types of filters include a source filter, which takes the data from some source, such as a file on disk, a satellite feed, an Internet server, or a VCR, and introduces it into the filter graph which is a connection of filters. The filter graph provides a transform filter, which converts the format of the data, a sink and source filter which receives data and transmits the data; and a rendering filter, which renders the data, such as rendering the data to a display device. The data could also be rendered to any location that accepts media. Other types of filters included in DirectShow include effect filters, which add effects without changing the data type, and parser filters, which understand the format of the source data and know how to read the correct bytes, create times stamps, and perform seeks.

Therefore, all data passes from filter to filter along with a good deal of control information. When filters are connected using the pins, a filter graph is created. To control the data flow and connections in a filter graph, DirectShow includes a filter graph manager. The filter graph manager assists in assuring that filters are connected in the proper order, but the data and much of the control do not pass through the filter graph manager. Filters must be linked appropriately. For example, the filter graph manager must search for a rendering configuration, determine the types of filters available, link the filters appropriate for a given data type and provide an appropriate rendering filter.

Although filters allow a great deal of reuse of programs, the use of filters also creates unanticipated problems. One of the problems created by filters is the large number of application programming interfaces (APIs) required by the filters. Each filter essentially has a separate API. Therefore, a given filter must be capable of interfacing to an API for every filter to which the filter might attach. Also, the use of filters makes the problem of shutting down a given filter problematic. When a given filter in a graph is shut down, any filter interfacing with the given filter must shut down any associated interfaces. In general, programming a filter to gracefully handle the loss of an interface is difficult as the state of the filter can be unknown when the interface is lost. The loss of interfaces therefore tends to lead to unpredicted behavior in the filters and ultimately to ill-behaved programs. What is needed is a system and method and associated data structures and interfaces that avoid unpredicted behavior.

SUMMARY OF THE INVENTION

According to embodiments of the present invention, a method and system provides interfaces, data structures and events for representing a "sink" of multimedia data to interact with objects in a multimedia system to control multimedia objects. The interfaces and data structures enable efficient management for media objects that must interface directly with each other. One embodiment is directed to providing a common interface and a single API to a plurality of media objects.

In an embodiment, a software layer, referred to as the control layer, isolates the objects from each other and provides a single point of control, allowing objects to be added or removed without affecting any other object. The control layer allows users to become familiar with only one API instead of many thereby facilitating the tasks of programming and documentation.

The control layer provides methods and data structures that enable addition and removal of sinks objects in isolation from other objects as well as other functions. In another embodiment, the control layer enables throttling of sink processes that interfaces to objects affected by the throttling. Additionally, interfaces provide coordination of key events, control of affected objects and efficient changing of data flow from one sink object to another.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
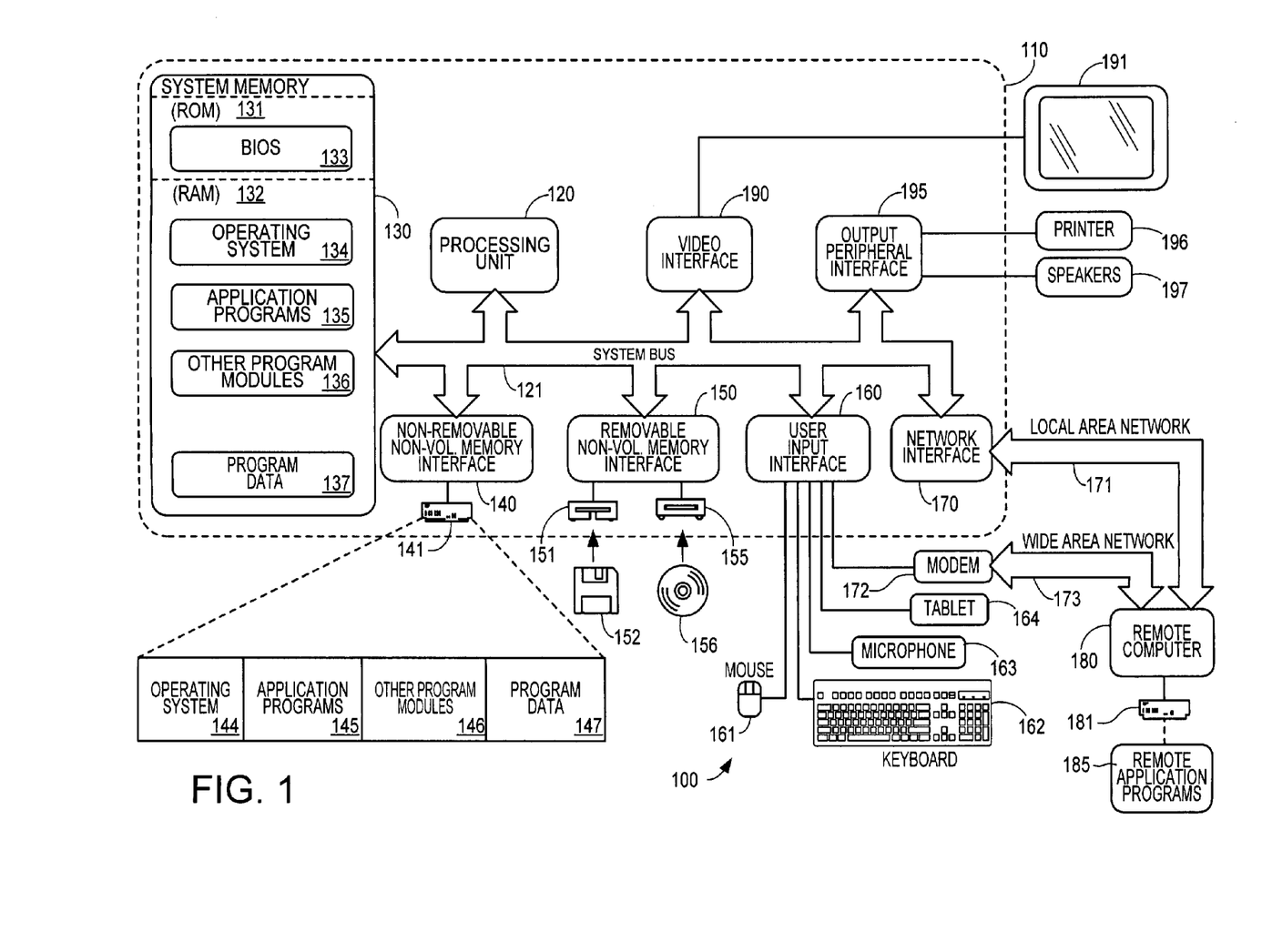
FIG. 1 is a block diagram generally illustrating an exemplary computing device with which the present invention can be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
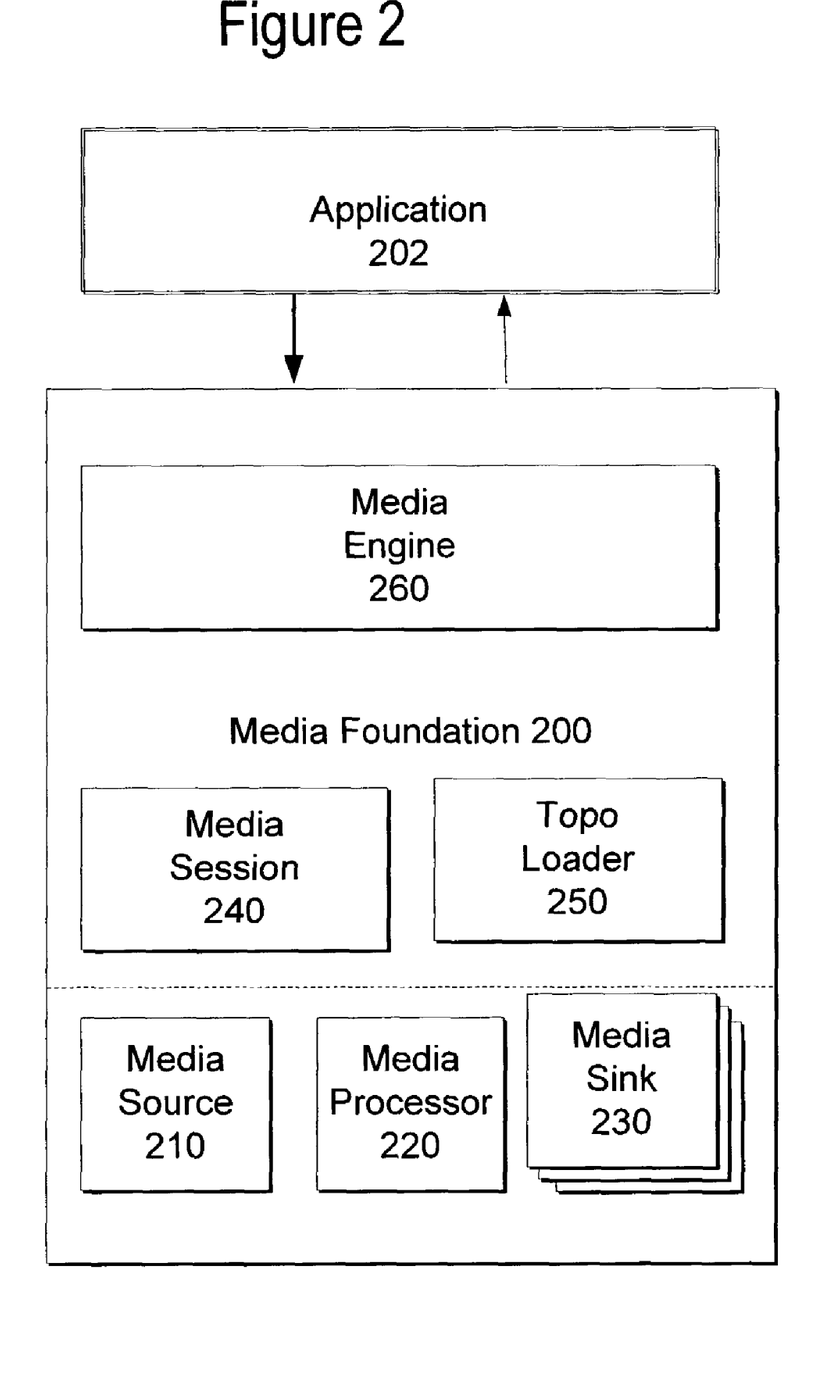
FIG. 2 is a block diagram of a media foundation system in accordance with an embodiment of the present invention.

Referring to FIG. 2, a block diagram illustrates a media foundation system 200 including main components, a media source 210, media processor 220 and media sink 230. Media foundation system 200 is shown coupled to application 202 to receive and send media streams. Media foundation system 200 includes media engine 260, media session 240 and topology loader 250. Data flows through the media foundation 200 by beginning with a media source 210, flowing through the media processor 220 and an output at media sink 230. Media session 240 guides the flow of data from the media processor to the media sinks and manages events that occur in any of the components in use, and the topology loader 250 generates a topology to transform the data from one media type to another. The media foundation system 200 provides interfaces and a layout for connecting streaming media objects.

Figure 3:
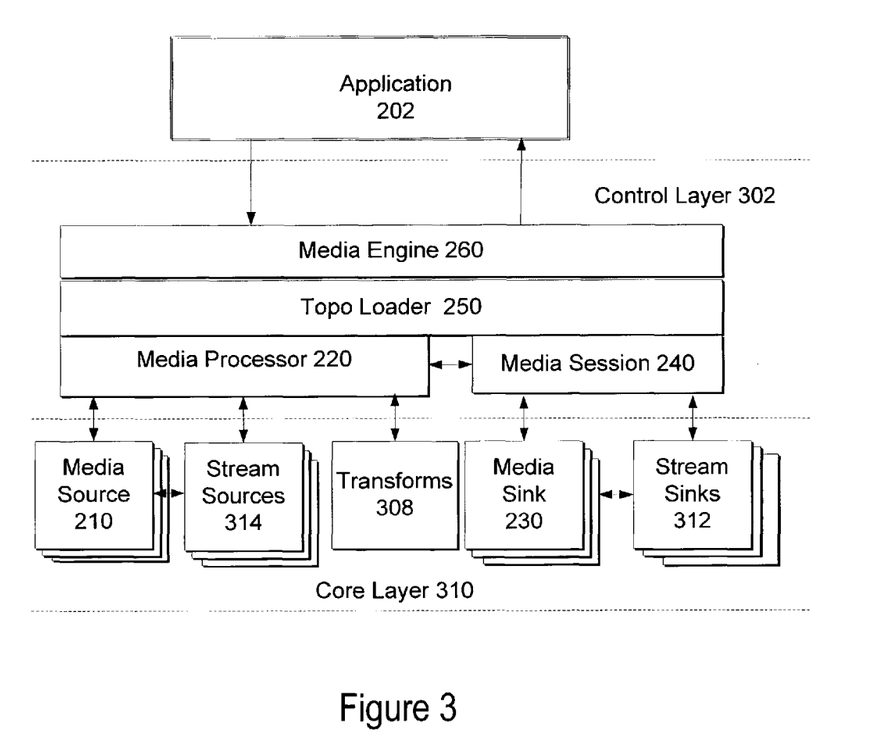
FIG. 3 is a block diagram illustrating a more detailed illustration of components of the media foundation system in accordance with an embodiment of the present invention.

Turning to FIG. 3, interactions between components in media foundation system 200 are shown in further detail. Media foundation is shown with control layer 302, providing a single interface to all objects. As shown in FIG. 3, media engine 260 communicates with a core layer 310 to direct a pipeline through one or more multimedia transforms and to the media sink. Objects, with only a few exceptions, are controlled, activated, removed, and sink and source information through media engine 260.

Objects run at the core layer 304. The core layer includes media source component 210, media processor 220, and media sink component 230. Stream sources 314 operate under the control of media source component 306; and stream sinks 312 operate under the control of media sink 230. Stream sources 314 transfer multimedia data from storage or capture devices to control layer 302 and stream sinks 312 transfer multimedia data from media engine 260 to rendering or storage devices (not shown). Media source component 210 implements state machines which provide control of stream sources 314. Media sink component 230 implements state machines which provide control of stream sinks 312. In each case, the state processing and data movement can be separated via instructions for state changes to the data.

Each of media source 210, media sink 230 and transforms 308, together with stream sources 314 and stream sinks 312 are objects that make up part of core layer 310. The objects are programs which implement a predefined function. Source component 306 and stream sources 314 provide either captured or retrieved multimedia data and provide this data to media engine 260. The sources of data include but are not limited to a disk such as a hard drive, CD, or DVD, the internet, random access memory (RAM), video RAM, video cameras, scanners, still image cameras, and microphones. Media sink 230 includes objects which control the transfer of data in stream sinks 312. Stream sinks 312 consist of objects which accept data from control layer 302 for storage or rendering. Sinks of data include but are not limited to a disk such as a hard drive, writable CD, or writable DVD, the internet, random access memory (RAM), video RAM, video cameras, printers, display devices such as monitors, and speakers. The data for both the media source 210 and media sink 230 can be transported over many media including but not limited to Ethernet, wireless networks, analog cables before digitization, USB, IEEE 1384, parallel port, serial port, and disk interfaces.

Transforms 308 include objects which manipulate the data. These transforms consist of encoders, decoders, splitters, multiplexers, audio processing such as bass and treble control for adding effects such as reverb, video processing such as adjusting color masks, image sharpening, and contrast or brightness control. The encoders and decoders handle both audio, video, and image data. Video data types can include MPEG, Apple Quicktime, AVI, and H.263. Note that many of the video standards are true multimedia standards in that these standards have provisions to transfer both audio and video. Image data formats include JPEG, GIF, Fax, and Tiff. Audio standards can include MP3, PCM, ADPCM, ASF, WMV, and WMA as well as standards for CD playback. Transforms 308 can be used to convert data from one format to another. For example, it is possible to convert a JPEG image into a format suitable for display on a monitor.

Media sink 230 can generate events. Events are messages from media sink 230 to media engine 260 that convey information regarding a change in status of an object in the media sink. Tables 1 and 2 list exemplary events which can be defined for media sink 230. As will be appreciated by one of skill in the art, the events disclosed herein are exemplary in nature and explained below to enable one of skill in the art with the benefit of this disclosure to change the events in accordance with design requirements.

TABLE 1

Summary of events reported by sink objects.

| | |
|---|---|
| MEStreamSinkStarted | Indicates the start of a data stream. |
| MEStreamSinkStopped | Indicates the end of a data stream. |
| MEStreamSinkPaused | Indicates that a data sink has been paused. |
| MEStreamSinkMarker | Indicates that the stream sink has reached a marker that was placed on it by the caller. This is often used to indicate the end of a segment of stream data. |

TABLE 2

Media sink events.

| | |
|---|---|
| MEMediaSinkInvalidated | The media sink sends this command when the media sink is no longer able to successfully sink data. |
| MESinkSwitchRequested | Switch to a different media sink. |

Media sink 230 provides several functions. First, media sink 230 provides a general interface on a per stream basis. An individual stream can be used for any of a variety of media destinations. Providing an interface on a per stream basis with a single interface greatly simplifies system design by providing a consistent interface to each stream and yet providing independence of the control of each stream. From the perspective of control layer 302, each stream appears the same. The objects in media sink 230 provide an abstraction layer that can make the control of the streams of different formats and from different sources appear identical to media engine 260.

Stream sink 312 provides for format negotiation. More specifically, stream sink 312 accepts data in one or more formats or media types. Stream sink 312 further provides an interface by which media engine 260 can find out what formats stream sink 312 supports and inform other components, such as media engine 260 the format to be used, which is referred to as "format negotiation".

Media sink 230 can also provide a clock for each stream sink 312. The clock can be used to control the rate at which a stream sink 312 moves data out of control layer 302. The clock can be controlled from the control layer by sending commands to media engine 260. Changing the clock rate therefore changes the rate at which data is delivered to the control layer. Controlling the clock rate can be used to implement such control as fast forward, frame advance, rewind as well as to provide general control of data rate delivery for normal rate playback of audio and video streams.

TABLE 3

Stream sink commands.

IMFStreamSink Interface

| | |
|---|---|
| IMFStreamSink::GetMediaSink | Get a pointer to the media sink to which the steam sink belongs. |
| IMFStreamSink::GetIdentifier | Get the identifier of a media sink |
| IMFStreamSink::GetMediaTypeHandler | Get the type of media in use |
| IMFStreamSink::ProcessSample | Process a sample |
| IMFStreamSink::PlaceMarker | Place a marker in the data stream in order to determine when the Stream Sink has finished processing all data it has received up to this point. Can also tell the stream sink about the end of the current segment of data. |
| IMFStreamSink::Flush | Remove all data that has not been processed. |

TABLE 4

Media sink interface control commands.

IMFMediaSink Interface

| | |
|---|---|
| IMFMediaSink::GetCharacteristics | Retrieve the characteristics of the media sink |
| IMFMediaSink::AddStreamSink | Add a stream sink |
| IMFMediaSink::RemoveStreamSink | Remove a stream sink |
| IMFMediaSink::GetStreamSinkCount | Reports the number of stream sinks associated with a given media sink. |
| IMFMediaSink::GetStreamSinkByIndex | Get a pointer to a stream sink associated with a media sink by the index in the media sink. |
| IMFMediaSink::GetStreamSinkByID | Get a pointer to a stream sink associated with a media sink by the stream sink identifier. |
| IMFMediaSink::SetPresentationClock | Set the rate of the presentation clock. |
| IMFMediaSink::GetPresentationClock | Retrieve the presentation clock. |
| IMFMediaSink::Shutdown | Media sink should finish processing and stop. |
| IMFPresentationTimeSource::GetTime | Get the current time from the media sink. |

TABLE 5

Sample allocation commands.

IMFSampleAllocator Interface

| | |
|---|---|
| GetCharacteristics | Retrieve characteristics of the sample allocator. |
| BeginAllocateResources | Asynchronous method to request that the sample allocator acquire whatever resources it needs to do sample allocation. |
| EndAllocateResources | End the asynchronous resource allocation process |
| FreeResources | Free all sample allocation resources |
| GetMaxAvailableSampleCount | Retrieve the maximum number of samples in a sample allocation. |
| AllocateSample | Synchronous method to request a sample. |
| BeginAllocateSample | Asynchronous method to request a sample. |
| EndAllocateSample | Retrieve samples requested by AllocateSample. |
| CancelPendingAllocations | Cancel all allocations. |

Control layer 302 can signal the stream sink that discontinuities in the stream data exist by placing the appropriate marker in the stream. The signaling of a discontinuity allows the stream sink to take corrective action when possible and conceal errors or correct formats when corrective action is not possible. Control layer 302 is further configured to notify stream sink 312 to expect a jump in the timestamps on samples.

The described architecture allows the type negotiation to occur separate from the stream sink. Separation is possible because the stream sinks and the type negotiation both take place in control layer 302 since the type information tends to change slowly and, as well, the type information is often embedded in the stream.

Consider the following example in which a JPEG image on a hard drive is to be displayed on a monitor. Application program 202 makes a request of the control layer 302 which will pass this request to media engine 260. Media engine 260 will start several objects including a media source component 210, which reads the image from disk, a transform 308 object to convert the image from JPEG to a format suitable for the video display device, and media sink 230 object to transfer the converted data to the video RAM.

Figure 4:
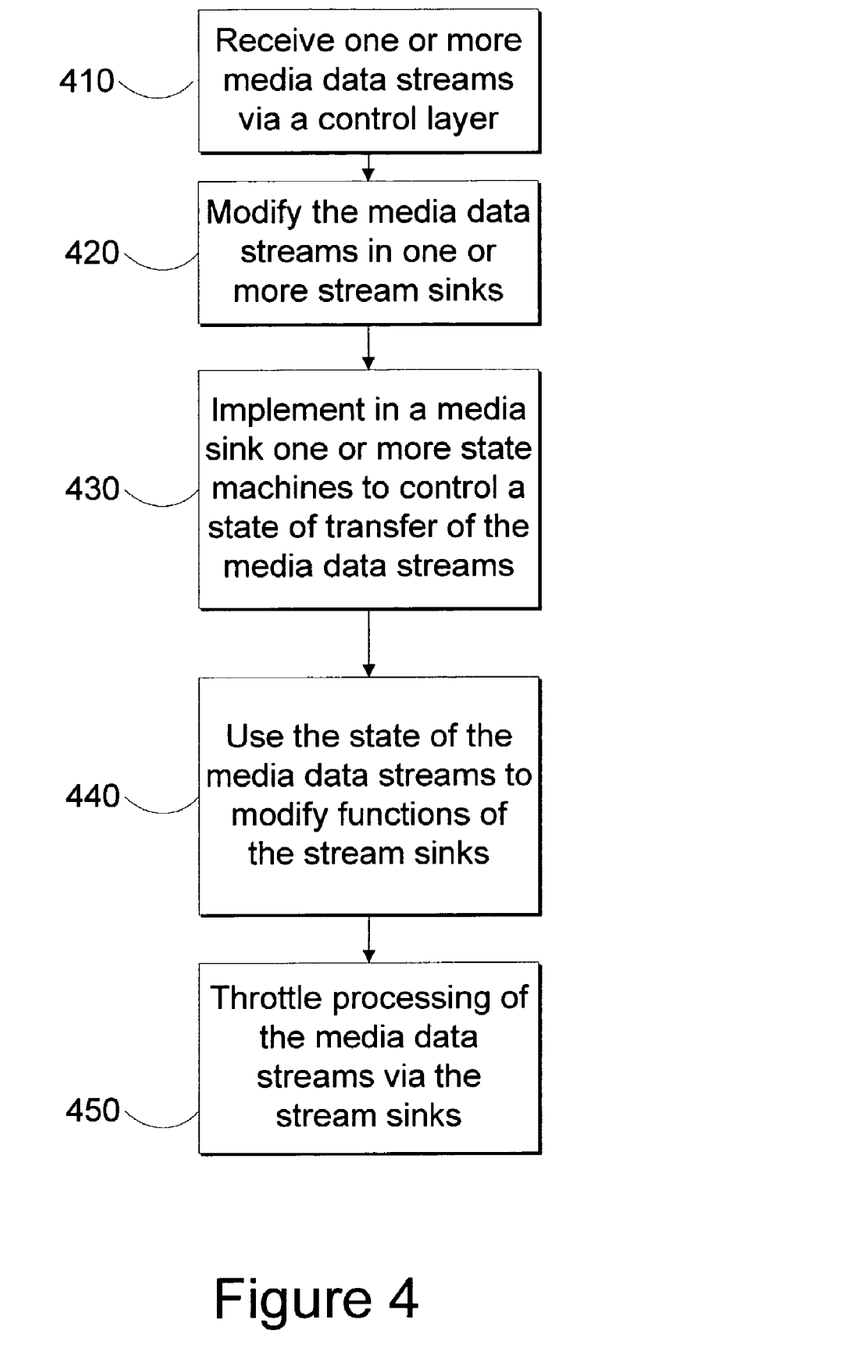
FIG. 4 is a flow diagram illustrating a method in accordance with an embodiment of the present invention.

Referring now to FIG. 4, a flow diagram illustrates a method according to an embodiment for processing media data. More specifically, block 410 provides for receiving one or more media data streams via a control layer. For example, referring to FIG. 3, application 202 or another source of media streams passes media data streams to control layer 302. Block 420 provides for modifying the data streams in one or more stream sinks. FIG. 3 illustrates stream sinks 312. As shown, stream sinks 312 are shown coupled to both control layer 302 and to media sink 230. Stream sinks 312 receive and respond to both control layer 302 and media sink 230. Block 430 provides for implementing one or more state machines to control a state of transfer of the media data streams in a media sink. The control can be dictated by the control layer 302. For example, media sink 230 implements one or more state machines to control the transfer of the media data streams. The media sink 230 implements the state machines according to control signals received from control layer 302. Block 440 provides for using the state of the media data streams to modify the functionality of the stream sinks. The state of the media data streams can be passed to the control layer 302 via media sink 230 or directly from stream sinks 312 to control layer 302. By providing the state machines in media sink 230, control of stream sinks 312 modification of the media data streams is dynamic due to the separation of the state machines from the control layer 302. Block 450 provides for throttling the processing via stream sinks. In one embodiment, media sink 230 and stream sinks 312 provide notifications for events to control layer 302. Thus, if a media sink 230 is invalid or if there is a switch to a second media sink 230, the event is known to control layer 302 via a notification. A media data stream can switch to a second media sink upon a detection of invalid media sink. In one embodiment media sink 230 can direct multiplexing of two or more of the media data streams into a same media sink. In another embodiment, stream sinks 230 throttle the progress of data through the Media Foundation pipeline by controlling the rate at which samples get allocated.

Control layer 302 directs control and timing for media sink 230 and stream sinks 312 via media engine 260. Media engine 260 can further direct format negotiation to be performed in stream sinks 312 and format the media data streams as appropriate for an output device, or other sink.

In view of the many possible embodiments to which the principles of this invention may be applied, it should be recognized that the embodiment described herein with respect to the drawing figures is meant to be illustrative only and should not be taken as limiting the scope of invention. For example, those skilled in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer storage medium having computer-executable instructions stored thereon that, when executed, cause a computing device to perform a method for processing data through a collection of one or more media objects, the method comprising:
   receiving from a stream-source object a plurality of media data streams at once in different formats via a control layer, which provides a single interface between the stream-source object and a plurality of other objects;
   transferring a media data stream of the plurality of media data streams to a transform object to be modified;
   receiving at the control layer the media data stream that was modified; and
   transferring the media data stream to a stream-sink object, which is usable to transfer the media data stream to a data sink, wherein the stream-sink object operates subject to a media-sink object that implements a state machine to control a state of transfer of the media data stream on a per stream basis, the state machine being implemented according to a control signal from the control layer.

2. The computer readable medium of claim 1 wherein modification of the data streams in the stream sink is dynamic.

3. The computer readable medium of claim 1 wherein one or more of the media sink and the stream sink provides notifications of events to the control layer.

4. The computer readable medium of claim 1 wherein the media data stream switches to a second media sink upon a detection of invalid media sink.

5. The computer readable medium of claim 1 wherein the media sink directs multiplexing of two or more of the media data streams into a same media sink.

6. The computer readable medium of claim 1 wherein the control layer directs control and timing of the media sink and the stream sinks.

7. The computer readable medium of claim 1 wherein the control layer directs format negotiation to be performed in the stream sinks, the format appropriate for an output device.

8. The computer readable medium of claim 1 wherein the control layer includes a media engine and a media processor, the media engine communicating with a core layer to direct a pipeline through one or more multimedia transforms and to the media sink.

9. A computing system, which includes one or more computing devices having a processor, a server, and a computer storage medium, the computing system configured to provide a multimedia system, the multimedia system comprising:
   a control layer maintained on one or more computing devices, the control layer configured to provide a single interface to a stream source, a transform, a media sink, and a stream sink; and a core layer maintained on the one or more computing devices, the core layer coupled to the control layer, the core layer including:
(1) the stream source, which transfers media data streams to the control layer;
(2) the transform, which receives the media data streams from the control layer and converts a format of the media data streams;
(3) the media sink configured to implement a state machine to control transfer of the media data streams on a per stream basis through the multimedia system, the state machine being implemented according to a control signal from the control layer; and
(4) a stream sink configured to dynamically modify the media data streams via the control layer and an identified state of the media data streams determined in the media sink components.

10. The computing system of claim 9 wherein the control layer is an application programming interface (API).

11. The computing system of claim 9 wherein the control layer includes a media engine and a media processor, the media engine communicating with a core layer to direct a pipeline through one or more multimedia transforms and to the media sink.

12. The computing system of claim 9 wherein the core layer includes a media source.

13. The computing system of claim 9 wherein the core layer is configured to communicate with the media sink to retrieve the characteristics of the media sink.

14. The computing system of claim 9 wherein the core layer is configured to communicate with the media sink to add an additional stream sink and remove one of the stream sinks.

15. The computing system of claim 9 wherein the core layer is configured to communicate with the media sink, the media sink enabled to report the number of stream sinks associated with a given media sink.

16. The computing system of claim 9 wherein the core layer is configured to communicate with the stream sinks to send a pointer to a stream sink associated with the media sink by an index in the media sink.

17. The computing system of claim 9 wherein the core layer is configured to communicate to send a pointer, to a stream sink associated with the media sink using a stream sink identifier.

18. The computing system of claim 9 wherein the core layer is configured to communicate to set a rate of a presentation clock and retrieve a presentation clock setting.

19. The computing system of claim 9 wherein the core layer is configured to communicate to retrieve characteristics of a sample allocator.

20. The computing system of claim 9 wherein the core layer is configured to request that a sample allocator acquire any needed resources.

21. The computing system of claim 9 wherein the core layer is configured to request that a sample allocator end an asynchronous resource allocation process.

22. The computing system of claim 9 wherein the core layer is configured to request that a sample allocator retrieve one or more of a maximum number of samples in a sample allocation and any requested samples.

23. The computing system of claim 9 wherein the core layer is configured to request that a sample allocator cancel one or more allocations.

24. A method for processing media data, the method comprising:
transferring, by a stream-source object, multimedia data to a control layer, which provides a single interface between the stream-source object and a plurality of other objects, wherein the stream-source object operates subject to control of a media-source object;
receiving at the control layer the multimedia data, which includes a plurality of media data streams in different formats;
transferring a media data stream of the plurality of media data streams to a transform object, which converts the media data stream into a format that is usable by a data sink;
receiving in the control layer the media data stream, which has been converted into the format; and
transferring the media data stream to a stream-sink object, which is usable to transfer the media data stream to the data sink,
(1) wherein the stream-sink object operates subject to a media-sink object that implements a state machine to control a state of transfer of the media data stream on a per stream basis, the state machine being implemented according to a control signal from the control layer, and
(2) wherein the control layer signals the stream-sink object that a discontinuity exists in another media data stream by placing an associated marker in the other media data stream.

25. The method of claim 24 wherein a modification of the media data stream in the stream-sink object is dynamic.

26. The method of claim 24 further comprising:
throttling processing of the media data stream via the stream-sink object based on the media-sink object.

27. The method of claim 24 wherein one or more of the media-sink object and the stream-sink object provide notifications of events to the control layer.

28. The method of claim 24 wherein the media data stream switches to a second media-sink object upon a detection of invalid media sink.

29. The method of claim 24 wherein the media-sink object directs multiplexing of two or more of the media data streams into a same media-sink object.

30. The method of claim 24 wherein the control layer directs control and timing of the media-sink object and the stream-sink object.

31. The method of claim 24 wherein the control layer directs format negotiation to be performed in the stream-sink object, the format appropriate for an output device.

32. The method of claim 24 wherein the control layer includes a media engine and a media processor, the media engine communicating with a core layer to direct a pipeline through the transform object and to the media-sink object.

33. The method of claim 32 wherein the core layer includes the media-sink object, the stream-sink object, the media-source object, the transform object, and the stream-source object.

34. The method of claim 24 wherein the stream-sink object accesses an application programming interfaces (API) that enables the stream-sink object to access a pointer to the media-sink object.

35. The method of claim 24 wherein the stream-sink object accesses an application programming interfaces (API) that provides an identifier for the media-sink object.

36. The method of claim 24 wherein the stream-sink object accesses an application programming interfaces (API) that provides a type of media in use.

37. The method of claim 24 wherein the stream-sink object accesses an application programming interfaces (API) configured to cause processing of a sample of the media data.

38. The method of claim 24 wherein the stream-sink object accesses an application programming interfaces (API) configured to remove any data that has not been processed.

39. The method of claim 24 wherein the stream-sink object accesses an application programming interfaces (API) configured to place a marker in the data stream to determine when the stream-sink object has finished processing received data associated with the marker.

40. The method of claim 24 wherein the stream-sink object accesses an application programming interfaces (API) configured to identify an end of a segment of the media data.

41. The method of claim 32 wherein the core layer is configured to communicate to retrieve characteristics of a sample allocator.

42. The method of claim 32 wherein the core layer is configured to request that a sample allocator acquire any needed resources.

43. The method of claim 32 wherein the core layer is configured to request that a sample allocator end an asynchronous resource allocation process.

44. The method of claim 32 wherein the core layer is configured to request that a sample allocator retrieve one or more of a maximum number of samples in a sample allocation and any requested samples.

45. The method of claim 32 wherein the core layer is configured to request that a sample allocator cancel one or more allocations.

* * * * *